United States Patent
Yuan et al.

(10) Patent No.: US 6,310,489 B1
(45) Date of Patent: Oct. 30, 2001

(54) METHOD TO REDUCE WIRE-OR GLITCH IN HIGH PERFORMANCE BUS DESIGN TO IMPROVE BUS PERFORMANCE

(75) Inventors: Leo Yuan, Los Altos; Christopher Cheng, Sunnyvale, both of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 755 days.

(21) Appl. No.: 08/640,096

(22) Filed: Apr. 30, 1996

(51) Int. Cl.[7] ................................................... H03K 17/16
(52) U.S. Cl. .............................................. 326/30; 326/114
(58) Field of Search .................................. 326/21, 26, 27, 326/30, 83, 86, 112, 114

(56) References Cited

U.S. PATENT DOCUMENTS

| | | | |
|---|---|---|---|
| 3,694,665 | * | 9/1972 | Belluche ................................ 326/30 |
| 4,849,659 | * | 7/1989 | West ...................................... 326/30 |
| 5,136,187 | * | 8/1992 | Ceccherelli et al. ................... 326/30 |
| 5,179,299 | * | 1/1993 | Tipon .................................... 326/30 |
| 5,239,559 | * | 8/1993 | Brach et al. ........................... 326/30 |
| 5,548,226 | * | 8/1996 | Takekuma et al. .................... 326/30 |

\* cited by examiner

*Primary Examiner*—Michael Tokar
*Assistant Examiner*—Don Phu Le
(74) *Attorney, Agent, or Firm*—Blakely Sokoloff Taylor & Zafman

(57) ABSTRACT

A system and method of reducing wire-or glitch to improve bus speeds. In a system that supports wire-or functions, the rise time of the wave created by the off-going driver is controlled. The off-going wave is forced to climb gradually such that one propagation delay of the loaded bus later, it is only marginally above a high threshold voltage. The fall time of the wave created by an on-going driver is minimized such that a strong negative going voltage propagates down the bus. This strong negative going voltage drags a composite wave on the bus (i.e. the combination of the waves of the on-going driver and the off-going driver) back below a low threshold voltage approximately one propagation delay after the switching occurs.

10 Claims, 3 Drawing Sheets

METHOD TO REDUCE WIRE-OR GLITCH IN HIGH PERFORMANCE BUS DESIGN TO IMPROVE BUS PERFORMANCE

BACKGROUND OF THE INVENTION (1) Field of the Invention

The invention relates to high performance bus architectures. More specifically, the invention relates to reducing the wire-or glitch in bus design supporting wire-or functions.

(2) Related Art

The "wire-or glitch" is a common problem in bi-directional electrical bus design. For example, where open drain drivers are connected to a bus terminated in pull-up resistor, if one driver turns off at the same time as another driver turns on, a wire-or glitch occurs. The problem is exacerbated by line length and line loading. The wire-or glitch in the above example is a positive going disturbance which occurs when one driver output turns off (goes high) while the other driver turns on (goes low). The glitch is caused by a sudden increase in line current which in turn generates a positive going voltage on the line. Some time is required for the on-going driver's output to drive the current back to the original level. Amplitude and length of the glitch depend on three factors: 1) current that the off-going output was conducting; 2) line impedance; and 3) line length between outputs. The settling time of the glitch is approximately the round trip delay of the loaded bus.

The performance of a bus is often determined in the context of cycle time. The cycle time is described by the equation: cycle time=clock to out+propagation delay of bus+setup of input+clock skew. For a bus performing wire-or functions, the cycle time equation becomes: cycle time= clock to out+two times the propagation delay of bus+set up of input+clock skew.

FIG. 1a shows a graph of negative-going wave 11 at the location of the on-going driver of a prior art system. FIG. 1b shows a graph of a positive-going wave 12 at the location of the off-going driver of a prior art system. FIG. 1c shows a graph of a composite wave 13 of a prior art wire-or system. Composite wave 13 corresponds to sampling the bus 3 at the location of the off-going driver at any instant in time. All three signals are shown relative to the powers supply voltage 52, a high threshold voltage ($V_{ih}$) 51, a low threshold voltage ($V_{il}$) 50, and a voltage operation level ($V_{ol}$) 53. Generally speaking, when the composite wave is below $V_{il}$ 50, the bus will be sampled low. When the composite wave is above $V_{ih}$ 51, the bus will be sampled high. When the bus falls between $V_{il}$ 50 and $V_{ih}$ 51, an indeterminate condition exists on the bus and it is not possible to sample the bus either high or low. One of ordinary skill in the art will recognize that these two threshold voltages 50 and 51 create a hysteresis in the bus signal. It is desirable to have this range between $V_{ih}$ and $V_{il}$ quite small because as the range increases, the noise margin on the bus diminishes.

In the prior art, off-going drivers rise uncontrolled to $V_{TT}$. Only the arrival of a negatively reflected wave, two propagation delays later, drags the bus down to where it can be accurately sampled. FIG. 1 shows a prior art wire-or system in which the rise time and the fall time are not controlled. Wave 11 is a negative going voltage created at the on-going driver (going low). Wave 12 is the positive going wave created by the off-going driver (going high) as it rapidly rises to $V_{TT}$ 52 before the negative going wave 11 arrives. Wave 13 is the composite wave that can be sampled on the bus at the off-going driver. As can be seen, the arrival of the negative going wave 11 only drives the composite wave down to about $V_{ih}$ 51 after the propagation delay. Thus, the bus can not be properly sampled until a negatively reflected wave arrives two propagation delays after the initial switching.

In a heavily loaded, long bus, the propagation delay becomes the most significant part of the overall cycle time. For example, the SPARC Center 2,000 work station available from Sun Microsystems of Mountain View, Calif. has ten slot backplane bus which supports wire-or functions at 40 MHz. The loaded bus one-way propagation delay is approximately 5 ns. Therefore, the bus settling time is the round trip of the loaded bus delay, approximately 10 ns. Accordingly, 10 ns of the 25 ns of cycle time are absorbed by the wire-or glitch settling time.

With 16 slots on a 16 inch backplane, the approximate propagation delay rises to 6.5 ns, with a round trip delay of 13 ns. As a demand for higher speed buses increases, the wire-or glitch becomes a critical limitation. It is, therefore, desirable to be able to reduce the wire-or glitch such that only a single propagation delay is required for the wire-or glitch to settle such that the bus can be properly sampled.

BRIEF SUMMARY OF THE INVENTION

A system and method of reducing wire-or glitch to improve bus speeds is disclosed. In a system that supports wire-or functions, the rise time of the wave created by the off-going driver (going high) is controlled. The off-going wave is forced to climb gradually such that one propagation delay of the loaded bus later, it is only marginally above a high threshold voltage. The fall time of the wave created by an on-going driver (going low) is minimized such that a strong negative going voltage propagates down the bus. This strong negative going voltage drags a composite wave on the bus (i.e. the combination of the waves of the on-going driver and the off-going driver) back below a low threshold voltage approximately one propagation delay after the switching occurs.

DETAILED DESCRIPTION OF THE INVENTION

Figure 1A:
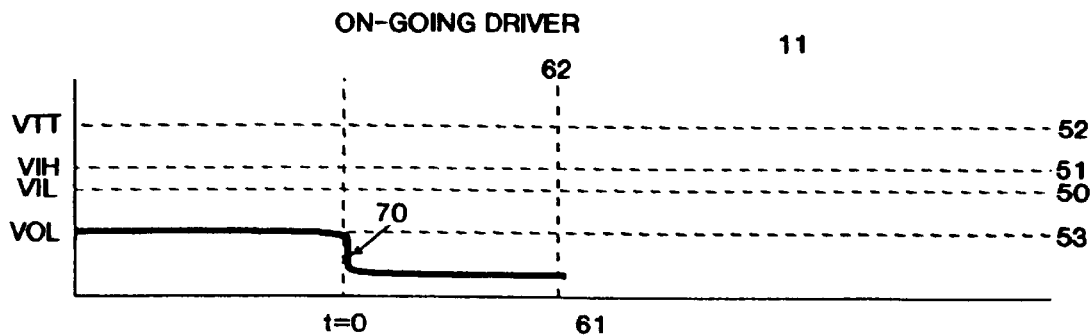
FIGS. 1a, 1b, and 1c are graphs of wave forms on the bus in a prior art system.
Figure 1B:
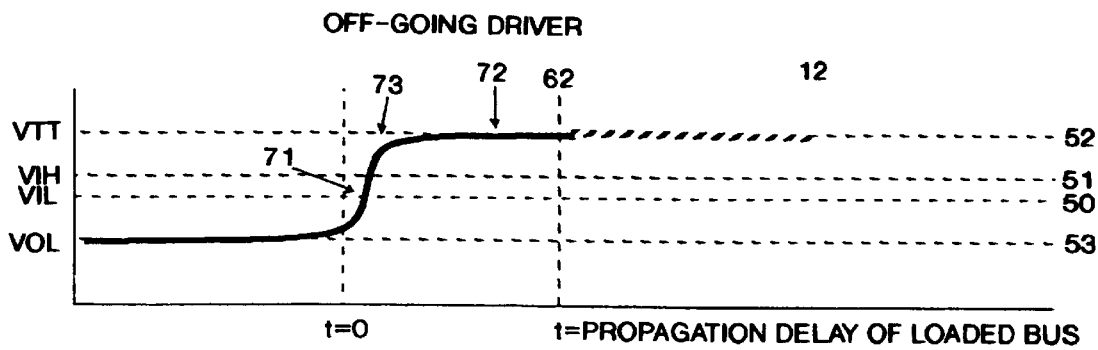
Figure 1C:
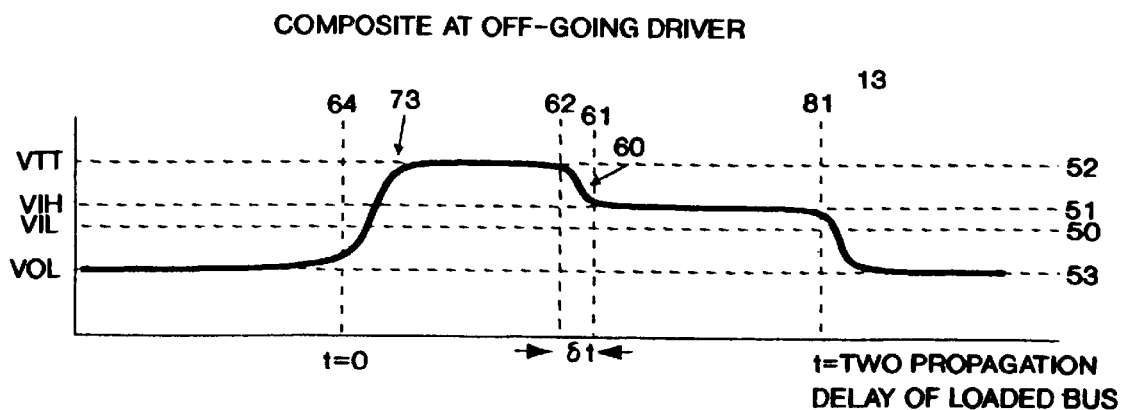
Figure 2:
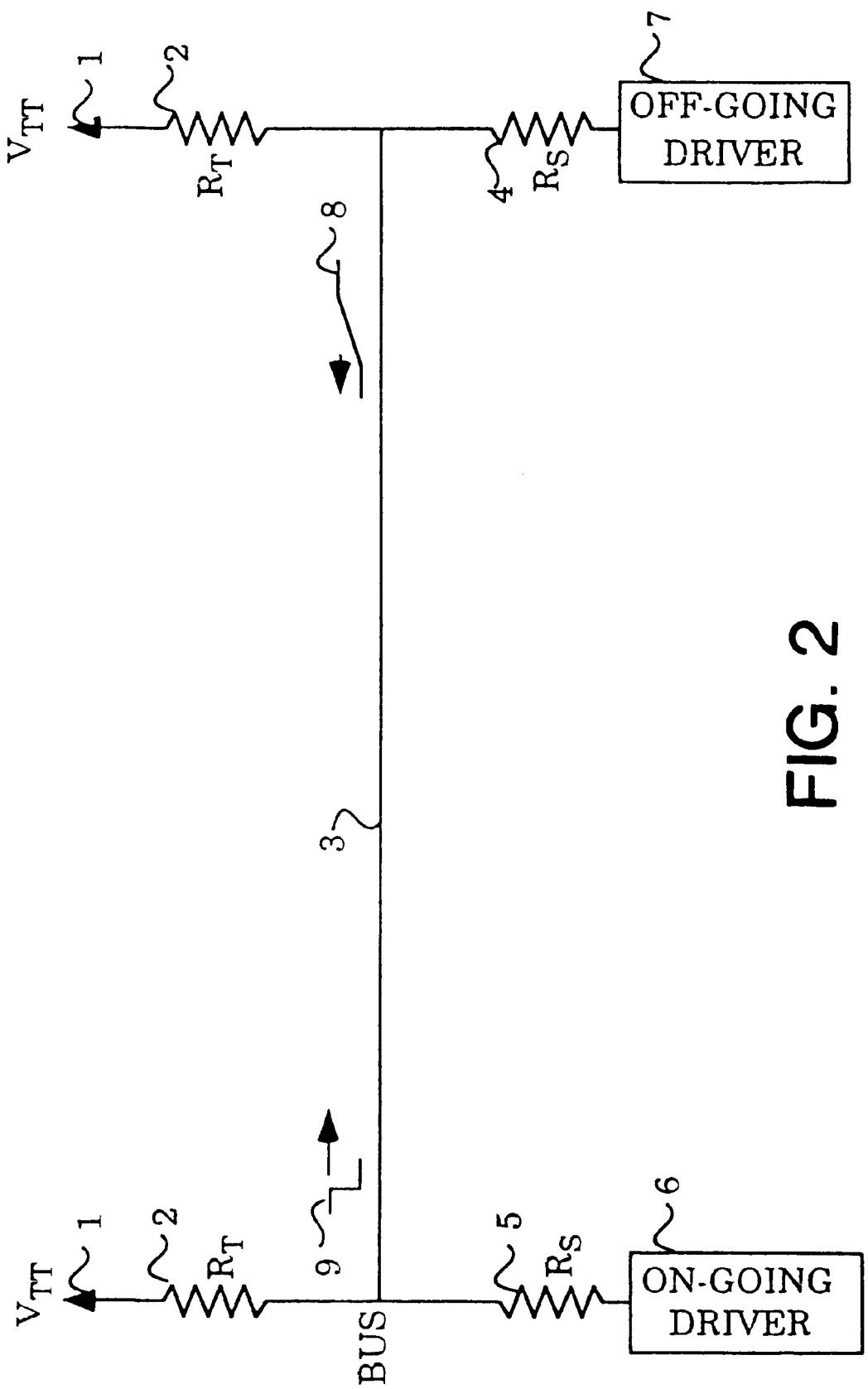
FIG. 2 is a diagram of a bus supporting wire-or and employing one embodiment of the invention.

FIG. 2 shows a diagram of a bus system supporting wire-or functions and employing the instant invention. Bus 3 is coupled to a power supply 1 supplying a voltage of $V_{tt}$ through termination resistors ($R_t$) 2 at either end of the bus. Additionally, a plurality of drivers, here on-going driver 6 and off-going driver 7, are coupled to the bus. Each driver is coupled to the bus through a series resistor ($R_s$). $R_s$ 5 and $R_s$ 4 corresponding to the on-going driver 6 and off-going driver 7, respectively, have the same nominal resistance. If on-going driver 6 turns on the same time off-going driver 7 turns off, on-going driver 6 generates a negative going voltage wave 9 which propagates down the bus away from on-going driver 6. Similarly, off-going driver 7 generates a positive going voltage wave 8 which propagates down the bus away from off-going driver 7. By controlling the rise time of positive going wave 8 and the fall time of negative going wave 9, as discussed further below, it is possible to reduce the wire-or glitch such that only a single propagation delay is required before the bus 3 can be correctly sampled.

In one embodiment, the series resistors are omitted entirely. However, use of the series resistor reduces ringing and reflection. Ringing is inductive noise proportional to dI/dt. Ringing often lasts several cycles and, thus, significantly reduces the noise margin on the bus. Because a turn on switching current of the drivers is given by the equation: Turn on current=$(V_{tt}-V_{ol})/(R_t+R_s)$, the bigger $R_s$ is the smaller will be the turn on current. $V_{ol}$ is the turn on voltage of the driver supplying the current. Smaller ΔI yields less ringing.

Reflection contributes to the wire-or glitch. During a signal transition (rising edge, falling edge, or wire-or), when the switching signal reaches the end of the signal trace at the termination, the reflected signal will have an amplitude equal to the original signal multiplied by the reflection coefficient.

$$\text{The reflection coefficient} = \frac{((R_{dr}+R_s)//R_t) - Z_{load}}{((R_{dr}+R_s)//R_t) + Z_{load}}$$

where $R_{dr}$ is the on/off resistance of the driver and $Z_{load}$ is the loaded impedance of the transmission line given by the equation $$Z_{load} = \text{Line impedance} / \left(sqrt\left(1 + \frac{C_{load}}{C_{line}}\right)\right).$$

Line impedance is the unloaded impedance of the bus 3. $C_{line}$ is the trace capacitance per section between each slot. $C_{load}$ is the capacitance of a daughter card including connector pin, board trace, chip circuit, and package loading. Because the introduction of $R_s$ 4, 5 causes the term $((R_{dr}+R_s)//R_t)$ to more nearly equal $Z_{load}$, the reflection coefficient diminishes with the introduction of $R_s$.

Currently, most printed circuit boards employ a 50Ω bus 3 with a $Z_{load}$ of about 25Ω. Even with $R_s$=8Ω, the reflection coefficient of such system is approximately 42%. By reducing the reflection coefficient, the wire-or glitch can also be reduced. Reducing the intrinsic impedance of the bus transmission line will reduce reflection coefficient. To minimize reflection, $Z_{load}$ should be kept as low as possible. In one exemplary embodiment, a trace line with line impedance of 27Ω±10% is employed, $C_{line}$ is approximately 5.5 pf, and typical $C_{load}$ is approximately 12.5 pf. $R_{dr}$ is approximately 7.5Ω, and $R_s$ is nominally 8Ω. Accordingly, $Z_{load}$ is approximately 14.9Ω, which gives a reflection coefficient of −17.5%. In this exemplary embodiment, a sixteen inch backplane fully loaded with sixteen slots can be operated at 83.5 MHz provided that the rise time and fall time of the off-going driver 6 and ongoing driver 7, respectively, are appropriately controlled. Control of rise time and fall time is discussed more fully below.

An additional advantage is achieved by reducing the intrinsic impedance of the bus 3. Specifically, propagation delay due to loading is reduced. The ratio between loaded and unloaded delay of the bus 3 is given by the equation $$\frac{\text{loaded delay}}{\text{unloaded delay}} = S_{qrt}(1+(C_{load}/C_{line})).$$

For any given load, loaded delay will be smaller if $C_{line}$ is bigger. The 27Ω transmission line of one exemplary embodiment has a $C_{line}$ of 5.5 pf as compared to the 3 pf $C_{line}$ of typical 50Ω transmission lines. Correspondingly in this exemplary embodiment, the loaded delay is 80% greater than the unloaded delay, while in the typical system, the loaded delay would be 130% greater than the unloaded delay.

Figure 3A:
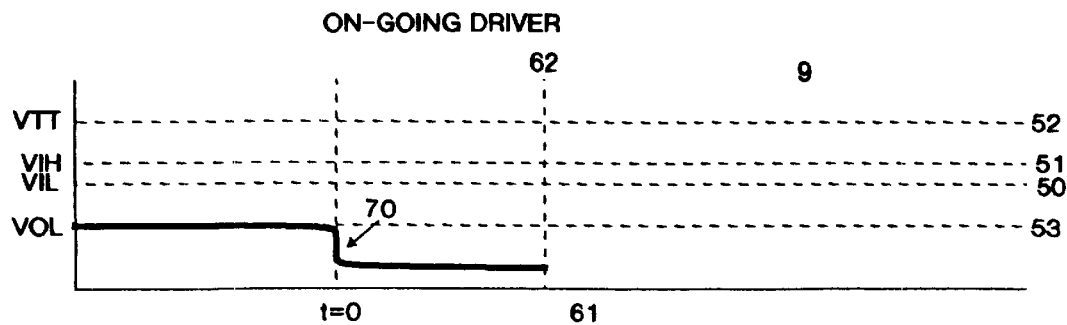
FIGS. 3a, 3b, and 3c are graphs of wave forms on the bus in one embodiment of the invention.

FIGS. 3a, b, and c show graphs of negative-going wave 9 at the location of the on-going driver, positive-going wave 8 at the location of the off-going driver, and a composite wave 10 for one exemplary embodiment of the instant invention respectively. Composite wave 10 corresponds to sampling the bus 3 at the location of the off-going driver at any instant in time. All three signals are shown relative to the powers supply voltage 52, a high threshold voltage ($V_{ih}$) 51, a low threshold voltage ($V_{il}$) 50, and a voltage operation level ($V_{ol}$) 53. Generally speaking, when the composite wave is below $V_{il}$ 50, the bus will be sampled low. When the composite wave is above $V_{ih}$ 51, the bus will be sampled high. When the bus falls between $V_{il}$ 50 and $V_{ih}$ 51, an indeterminate condition exists on the bus and is not possible to sample the bus either high or low. One of ordinary skill in the art will recognize that these two threshold voltages 50 and 51 create a hysteresis in the bus signal. It is desirable to have this range between $V_{ih}$ and $V_{il}$ quite small because as the range increases, the noise margin on the bus diminishes.

Switching point 64 is also labeled t=0. Propagation time 62 is one propagation delay of the loaded bus beyond switching time 64. In one exemplary embodiment, at switching time 64, the voltage of the off-going driver jumps to a predetermined voltage 73 below $V_{il}$ 50, and then begins a gradual ascent 72 towards $V_{tt}$ 52. Because the voltage jump 71 remains within the range that can be sampled low, this jump 71 does not prevent control of the wire-or glitch. Rather, the jump 71 reduces the voltage range over which the gradual ascent 72 is controlled. In the instant invention, the gradual ascent 72 is controlled to ensure that one propagation delay 62 later, the off-going driver signal 8 will be only marginally above $V_{ih}$ 51. The relatively narrow voltage range over which the rise must be controlled increases both the accuracy and ease of such control.

Figure 3B:
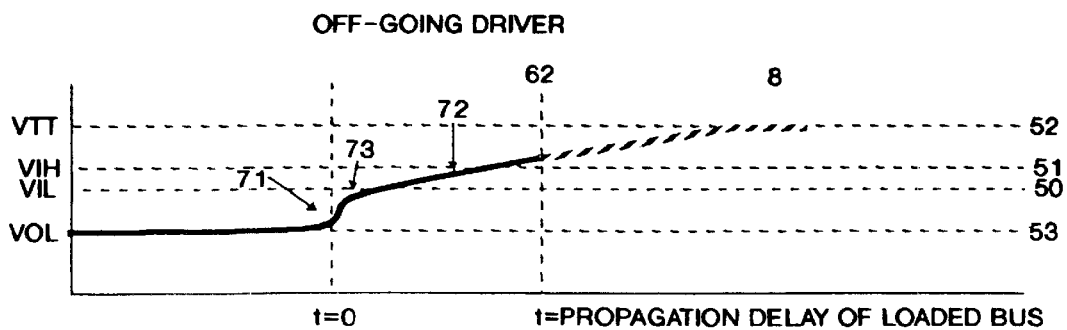
Figure 3C:
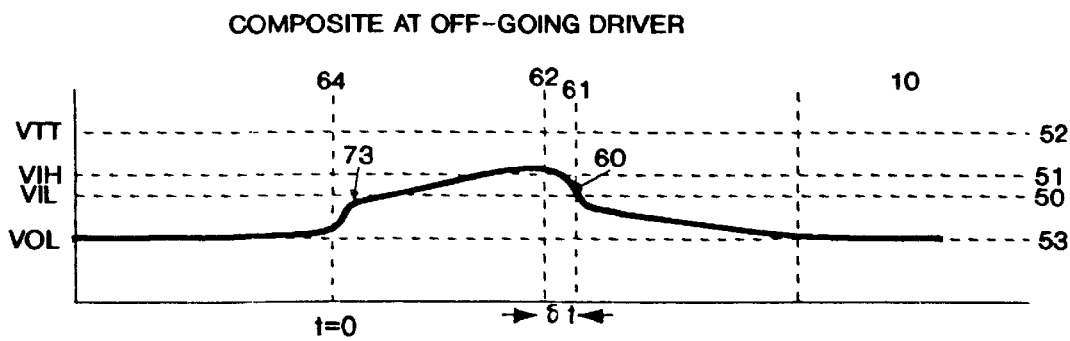

Simultaneously, at switching time 64, the ongoing driver drives a voltage of predetermined drop below $V_{ol}$ 53. The fall time 70 is minimized. In FIG. 3, the fall time 70 is shown as an ideal instantaneous drop. However, it will be recognized by one of ordinary skill in the art that some slewing will always occur. Moreover, introduction of $R_s$ exacerbates the slewing. Therefore, it is important to control the slewing so that the slewing is minimized and the fall time occurs as rapidly as possible. This fast fall time 70 creates a strong negative-going wave 9 which propagates down the bus 3 and one propagation delay later, creates a composite wave 10 at the location of off-going driver 7. The composite wave 10 is pulled down proportionally to the difference in slope of the positive going wave 8 and the negative going wave 9. By appropriately selecting the voltage drop below $V_{ol}$ 53 in coordination with the real fall time 70, the composite wave will be pulled back below $V_{il}$ 50 Δt 61 after one propagation delay of the loaded bus (e.g., fall time equals ∂t). Thus, as fall time 70 goes to 0, as in the ideal case, ∂t also goes to 0, and the bus will be able to be accurately sampled one propagation delay after switching time 64.

The rise time of the off-going driver can be controlled in several ways. Among the possible ways are delayed turn-on of transistors. Under this method, instead of a single large transistor, multiple smaller transistors are used to form the driver. By turning the small transistors on individually over time, the voltage appearing on the bus and, thus, the effective rise time increases in gradual steps. Alternatively, by controlling the voltage at the gate of the driver and gradually increasing it, the transition from completely off to on or vice versa can be controlled. However, because the transition range between on and off is typically quite narrow, it is difficult to effectively control the voltage over a significant range. Another alternative is to control the slew rate of the off-going driver to maximize the slewing. It is also possible to combine any or all of the above methods of controlling the rise time.

In an alternative exemplary embodiment, jump 71 is eliminated and gradual ascent 72 begins from $V_{ol}$ 53. In such embodiment, the positive going voltage wave 8 should still be only marginally above $V_{ih}$ 51 when the negative going voltage wave 9 arrives one propagation delay later 62.

In the foregoing specification, the invention has been described with reference to specific embodiments thereof. If will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of improving a system cycle time in a system implementing wire-or function comprising the step of:

reducing a wire-or glitch so that a bus can be sampled after a single trip propagation delay.

2. The method of claim 1 wherein the step of reducing comprises the steps of:

slowing a rise time of a first signal driven on the bus by an off-going driver; and minimizing a fall time of a second signal driven on the bus by an on-going driver.

3. The method of claim 2 wherein the step of reducing further comprises the step of decreasing a reflection coefficient of a transmission line of the bus.

4. The method of claim 3 wherein the step of decreasing comprises the steps of:

coupling a series resistor to each driver on the bus; and providing a plurality of bus traces having an intrinsic impedance less than approximately 30 ohms.

5. The method of claim 2 wherein the step of slowing comprises the steps of:

incrementally increasing the voltage of the first signal such that the second signal propagates along the bus and reaches the first signal before the first signal reaches a predetermined voltage.

6. The method of claim 2 wherein the step of slowing comprises the steps of:

driving the first signal to a voltage below a lower threshold voltage; and incrementally increasing the voltage of the first signal until a terminal voltage is reached.

7. A system supporting wire-or functions comprising:

a plurality of drivers disposed along a bus, the drivers having a gradual rise time and rapid fall time such that for any pair of simultaneously switching drivers along the bus, a falling signal will propagate to a rising signal before the rising signal reaches a predetermined level; and a first terminal resistor and second terminal resistor coupled to a first end and a second end of the bus, respectively.

8. The system of claim 7 further comprising:

a plurality of series resistor, one series resistor being disposed between the bus and each driver of the plurality of drivers.

9. The system of claim 7 wherein the bus has a line impedance of in the range of approximately 24 to 30 ohms.

10. The system of claim 8 wherein each resistor of the plurality of series resistors has a resistance of approximately 8 ohms.

\* \* \* \* \*